(12) United States Patent
Stokman et al.

(10) Patent No.: US 11,909,203 B2
(45) Date of Patent: Feb. 20, 2024

(54) DC POWER DISTRIBUTION ARCHITECTURE AND METHOD APPLICABLE TO DATA CENTERS

(71) Applicant: DC Systems B.V., Aalsmeer (NL)

(72) Inventors: Henricus David Stokman, Aalsmeer (NL); Panagiotis Kolios, Leiden (NL)

(73) Assignee: DC Systems B.V., Aalsmeer (NL)

( * ) Notice: Subject to any disclaimer, the term of this patent is extended or adjusted under 35 U.S.C. 154(b) by 3 days.

(21) Appl. No.: 17/883,792

(22) Filed: Aug. 9, 2022

(65) Prior Publication Data

US 2023/0054222 A1      Feb. 23, 2023

Related U.S. Application Data

(60) Provisional application No. 63/233,772, filed on Aug. 17, 2021.

(51) Int. Cl.
| | |
|---|---|
| H02J 1/04 | (2006.01) |
| H02J 1/10 | (2006.01) |
| H02J 1/08 | (2006.01) |

(52) U.S. Cl.
CPC ............... *H02J 1/04* (2013.01); *H02J 1/086* (2020.01); *H02J 1/106* (2020.01)

(58) Field of Classification Search
None
See application file for complete search history.

(56) References Cited

U.S. PATENT DOCUMENTS

| 11,048,311 B1 | 6/2021 | Churnock et al. | |
| 2012/0044014 A1* | 2/2012 | Stratakos | H03K 17/122 |
| | | | 327/530 |
| 2017/0070056 A1* | 3/2017 | Dickey | H02J 4/00 |
| 2020/0127491 A1* | 4/2020 | Ansett | G06F 11/2015 |
| 2022/0269325 A1 | 8/2022 | Huang et al. | |

FOREIGN PATENT DOCUMENTS

CN        212210598 U     12/2020

OTHER PUBLICATIONS

European Search Report and Search Opinion dated Jan. 5, 2023 for corresponding European Patent Application No. 22183976.4, 9 pages.

* cited by examiner

*Primary Examiner* — Jared Fureman
*Assistant Examiner* — Joel Barnett
(74) *Attorney, Agent, or Firm* — Locke Lord LLP

(57) ABSTRACT

Some embodiments provide a DC power distribution system that includes a plurality of DC sources coupled to a plurality of DC buses via respective protection devices that are configured to selectively cause an open-circuit between the DC source and the respective DC bus in the event of a fault or overload condition on the respective DC bus. The plurality of DC buses are coupled to a load combiner, and the system is configured to supply power in parallel from the DC sources via the plurality of DC buses to at least one DC/DC step-down converter via the load combiner, which combines the power supplied via the plurality of DC buses. The DC buses, load combiner, and the DC power sources are configured such that the total maximum load current is capable of being supplied via less than all of the plurality of DC buses in the event that any one of the DC buses is non-operational.

9 Claims, 11 Drawing Sheets

DC POWER DISTRIBUTION ARCHITECTURE AND METHOD APPLICABLE TO DATA CENTERS

The present disclosure relates to DC power distribution and, more particularly, some embodiments relate to DC power distribution architectures and associated systems and methods that are well-suited for data centers and/or other facilities or structures comprising critical loads.

BACKGROUND

DC electrical grids are gaining more prominence due to a number of advantages that a DC-operated electrical grid may have over an alternating current (AC)-operated electrical grid. Yet one area where AC power distribution has remained the prevailing and incumbent technology—despite recognized advantages of DC power distribution—is in the supply of critical loads, such as in data centers.

More specifically, for example, one well-recognized advantage of DC power distribution in data centers is that it provides for improved efficiency by eliminating certain power conversion steps required by an AC power distribution system that brings AC power to the load equipment (e.g., servers), where it is converted to DC. Because of the large power requirements of a typical data center, improved efficiency translates not only into reduced costs but also into reduced greenhouse emissions, as a significant fraction of power supplying data centers may be from non-renewable sources. But, as noted, most data center installations use AC power distribution.

Accordingly, there remains a need for an improved DC distribution architecture that is well-suited for critical loads, such as for use in a data center, and that provides for not only high efficiency power distribution, but also high reliability, redundancy, and safety.

SUMMARY OF SOME ILLUSTRATIVE EMBODIMENTS

The present disclosure describes various illustrative embodiments of a DC power distribution architecture that is well-suited for powering critical loads, such as critical loads in data centers. In accordance with some embodiments, the DC power distribution architecture may comprise a mesh-grid architecture.

In some embodiments, a DC power distribution system may comprise a plurality of DC sources each coupled to each of a plurality of DC buses via respective first protection devices that are configured to selectively cause an open-circuit between the DC source and the respective DC bus in the event of a fault or overload condition on the respective DC bus. The plurality of DC buses are coupled to a load combiner, and the system is configured to supply power in parallel from the DC sources via the plurality of DC buses to at least one DC/DC step-down converter via the load combiner, which combines the power supplied via the plurality of DC buses and outputs the combined power to the at least one DC/DC step-down converter, which output(s) power to at least one load coupled thereto. The load combiner includes at least one second protection device configured to selectively cause an open-circuit between the at least one load coupled thereto and at least one of the plurality of DC buses in the event of a fault or overload condition in the at least one load coupled to the load combiner, thereby providing selectivity with respect to the at least one load coupled to the load combiner.

The DC buses, load combiner, and the DC power sources may be configured such that the total maximum load current is capable of being supplied via less than all of the plurality of DC buses in the event that any one of the DC buses is non-operational. For instance, a DC bus may become non-operational in the event that a fault (e.g., short circuit) condition on the DC bus causes each of the first protection devices coupled thereto to switch to an open-circuit condition, thereby decoupling the DC bus from each of the DC sources. In such an event, the power required by the at least one load (e.g., the total maximum load current at the nominal voltage) is supplied by the DC sources via the operational DC buses, and the increase in power or current supplied via each such operational DC buses may occur without requiring any additional actively controlled switching (e.g., other than the switching to the open-circuit state of the first protection devices).

In some embodiments, the DC power distribution system may comprise a plurality of the load combiners, each load combiner coupled to each of the DC buses, each load combiner coupled to at least one corresponding DC/DC step-down converter that is coupled to at least one corresponding load.

In some embodiments, a DC power distribution system may comprise a plurality, M, of DC buses, wherein M is an integer greater than one and M=(N+1), and wherein each of the M DC buses comprises a plurality of bus conductors; a plurality, K, of DC power sources, wherein K is an integer greater than one and K=(J+1), and wherein the DC power sources are configured to have a nominally and/or substantially equal output voltage; and at least one load combiner. Each of the K DC power sources may be (i) coupled to each of the M DC buses in parallel via a respective first protection device that is configured to selectively cause an open-circuit between the DC power source and the respective DC bus in the event of a fault or overload condition on the respective DC bus, and (ii) configured to, in operation, supply a current in parallel at the nominally and/or substantially equal output voltage to each of the M DC buses for which the respective first protection device of the DC power source is in a closed-circuit state. Each of the at least one load combiner may be located at or within at least one load device such that each load device supplied by the DC power distribution system is supplied power via at least one load combiner, wherein the load combiner is coupled to each of the plurality of DC buses and configured to provide an output to at least one DC-to-DC step-down converter coupled to the at least one load device, wherein the load combiner comprises at least one second protection device configured to selectively cause an open-circuit between the plurality of DC buses and said output in the event of a fault or overload condition in one or more of the at least one load device coupled to the output via at least one DC-to-DC step-down converter. Each of the DC power sources may supply approximately an equal share of the load current supplied by the DC buses to which the DC power source is conductively connected during operation. The DC power distribution system may be configured to provide at least (J+1) redundancy based on the total maximum load, and the DC buses, the load combiners, and the DC power sources are each configured such that the total maximum load current is capable of being supplied via less than M of the DC buses, in the event that any one of the M buses is (e.g., becomes) non-operational.

In some embodiments, the DC buses, the load combiners, and the DC power sources are each configured such that the total maximum load current is capable of being supplied via any of N DC buses in the event that any one of the M buses is non-operational. In some embodiments, the DC buses, the load combiners, and the DC power sources are each configured such that the total maximum load current is capable of being supplied via not less than any two of the DC buses, in the event that all but two of the M buses are non-operational. In some embodiments, the DC buses, the load combiners, and the DC power sources are each configured such that the total maximum load current is capable of being supplied via any one of the DC buses, in the event that all but one of the M buses are non-operational.

In some embodiments, each of the DC power sources may have substantially the same power capacity.

In some embodiments, each of the bus conductors may comprise a bus bar that is connected to each of the DC power sources and to at least one load combiner.

In some embodiments, each of the bus conductors may comprise a first bus bar that is connected to each of the DC power sources, and a second bus bar that is connected to the first bus bar and to at least one load combiner, wherein the first bus bar has a greater per unit length conductance than the second bus bar.

In some embodiments, the load combiner may comprise M branches, each branch connected to a respective one of the DC buses and forming an OR connection to provide said output, each branch comprising a diode coupled in series with a transistor switch, each transistor switch being controlled to switch to an open-circuit state in the event of a fault or overload condition in one or more of the at least one load device supplied power via the load combiner.

In some embodiments, the DC power distribution system may further comprise at least one DC energy storage system, wherein each of the at least one DC energy storage system is (i) configured to have the nominal and/or substantially equal output voltage, (ii) coupled to each of the M DC buses via a respective third protection device that is configured to selectively cause an open-circuit between the DC energy storage system and the respective DC bus in the event of a fault or overload condition on the respective DC bus, and (iii) configured to, in operation, supply a current in parallel to each of the M DC buses for which the respective third protection device of the DC energy storage system is in a closed-circuit state, wherein each of the at least one DC energy storage system is configured to supply its respective current at the nominally and/or substantially equal output voltage.

It will be appreciated by those skilled in the art that the foregoing brief description and the following description with respect to the drawings are illustrative and explanatory of some embodiments of the present invention, and are neither representative nor inclusive of all subject matter and embodiments within the scope of the present invention, nor intended to be restrictive or characterizing of the present invention or limiting of the advantages which can be achieved by embodiments of the present invention, nor intended to require that the present invention necessarily provides one or more of the advantages described herein with respect to some embodiments. Thus, the accompanying drawings, referred to herein and constituting a part hereof, illustrate some embodiments of the invention, and, together with the detailed description, serve to explain principles of some embodiments of the invention.

BRIEF DESCRIPTION OF THE DRAWINGS

Aspects, features, and advantages of some embodiments of the invention, both as to structure and operation, will be understood and will become more readily apparent in view of the following description of non-limiting and non-exclusive embodiments in conjunction with the accompanying drawings, in which like reference numerals designate the same or similar parts throughout the various figures, and wherein.

DETAILED DESCRIPTION OF SOME ILLUSTRATIVE EMBODIMENTS

Figure 1:
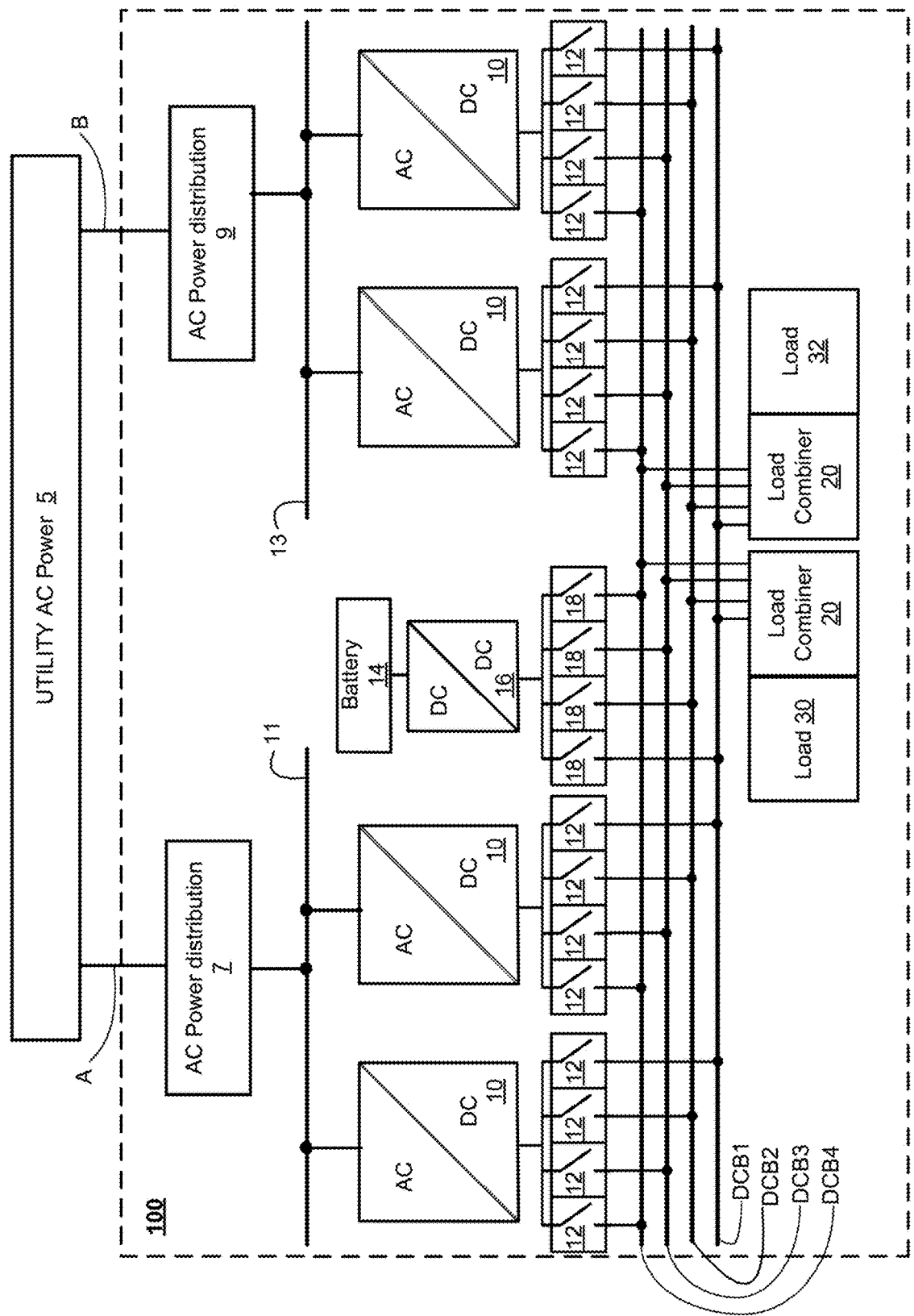
FIG. 1 schematically depicts a block diagram of a DC distribution architecture, in accordance with some embodiments.

Throughout the description and claims, the following terms take at least the meanings explicitly associated herein, unless the context dictates otherwise. The meanings identified below do not necessarily limit the terms, but merely provide illustrative examples for the terms.

The phrase "an embodiment" as used herein does not necessarily refer to the same embodiment, though it may. In addition, the meaning of "a," "an," and "the" include plural references; thus, for example, "an embodiment" is not limited to a single embodiment but refers to one or more embodiments. Similarly, the phrase "one embodiment" does not necessarily refer to the same embodiment and is not limited to a single embodiment. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise.

In addition, as used herein, unless the context clearly dictates otherwise, the term "coupled" refers to directly connected or to indirectly connected through one or more intermediate components and, in some contexts, may also denote or include electrically coupled, such as conductively coupled, capacitively coupled, and/or inductively coupled. Further, "conductively coupled (connected)," "electrically coupled (connected)," and similar variants, each refer to being coupled (connected) via one or more intermediate components that permit energy transfer via conduction current, which is capable of including direct current as well as alternating current, while "capacitively coupled" refers to being electrostatically coupled through one or more dielectric media, and possibly also via one or more intervening conductors (e.g., via a series of capacitive components), that permit energy transfer via displacement current and not via direct current between the coupled (connected) components. Those skilled in the art will further understand that elements may be capacitively coupled intentionally or unintentionally (e.g., parasitically) and that in some contexts, elements said to be capacitively coupled may refer to intentional capacitive coupling. In addition, those skilled in the art will also understand that in some contexts the term "coupled" may refer to operative coupling, through direct and/or indirect connection. For instance, a conductor (e.g., control line) said to be coupled to the gate of a field effect transistor (FET) may refer to the conductor being operable to control the gate potential so as to control the operation of the FET (e.g., switching the FET between "on" and "off" states), regardless of whether the conductor is connected to the gate indirectly (e.g., via another transistor, etc.) and/or directly.

For clarity, while the terms medium-voltage and low-voltage may have different definitions in various standards, or otherwise may be understood as having different meanings in various contexts, as used herein, medium-voltage may refer to an alternating current (AC) root mean square (rms) voltage in the range of about 1 KV to about 52 KV or to a direct current (DC) voltage in the range of about 1.5 KV to about 75 KV; and low-voltage may refer to an alternating current (AC) rms voltage less than about 1 KV or to a direct current (DC) voltage less than about 1.5 KV. As may be understood by the ensuing disclosure, however, embodiments in accordance with the present disclosure are not limited to a particular voltage or voltage range.

FIG. 1 schematically depicts an illustrative block diagram of a DC power distribution architecture within a facility 100 in accordance with some embodiments according to the present disclosure. It will be understood by those skilled in the art that for clarity features are generally represented in block diagram form and not all features or details of such a system are depicted, including, for example, various electrical components, connections, connectors, associated equipment, backup and/or alternative power sources, and the like. It will be further understood by those skilled in the art in view of the ensuing disclosure that while illustrative embodiments herein are primarily set forth, by way of example, in the context of a data center, alternative embodiments according to the present disclosure may be directed to other DC power distribution applications, such as DC power distribution systems for a commercial building, a factory, and marine and offshore applications (e.g., such as vessel services and/or vessel propulsion loads). For ease of reference, as used herein, the term "facility" refers to any structure or assembly (e.g., such as a data center, a commercial building, a factory, a ship) in which a DC power distribution system in accordance with some embodiments of the present disclosure may be implemented.

As shown, by way of example, AC power from a utility 5 is provided via two independent utility lines (e.g., feeders) A and B to facility 100, which in this illustrative embodiment is a data center. Particularly, data center 100 includes AC power distribution equipment 7 and 9, which receive AC power from feeders A and B, respectively. Those skilled in the art will understand that in some implementations the data center site may itself include a substation that receives AC power from the utility and provides AC power feeders A and B to AC power distribution equipment 7 and 9. In this illustrative embodiment, the utility lines A and B feeding the data center comprise medium voltage (MV) lines provided in a redundant configuration; for instance, utility lines A and B may originate from separate substations of the utility. By way of non-limiting example, utility feeders A and B may each have an AC voltage level of about 10 kV at 50 Hz or 60 Hz, provided as three-phase power.

AC Power distribution equipment 7 and 9 may include, for example, MV switchgear, transient protection circuitry, backup power sources (e.g., battery coupled to an inverter, a generator, etc.), and a transformer for stepping the MV AC power down to a low AC voltage level, such as, by way of non-limiting example, to an AC voltage in the range of 200 V to 800 V, depending on the desired nominal DC voltage range to be provided on the DC distribution buses (further described below) and, e.g., on the efficiency of AC-to-DC conversion (also further described below). And the desired nominal DC voltage range to be provided on the DC distribution bus may be, for example, determined based on the nominal total load power demand and correspondingly on the nominal DC current levels and associated power distribution losses (e.g., so-called $I^2R$ losses). Simply for purposes of clarity of exposition, an example of the AC voltage output to AC nodes or buses 11 and 13 may be nominally 400 V for this illustrative embodiment.

Those skilled in the art will understand that while the simplified, schematically depicted AC power distribution network comprising the utility feeders A and B and distribution equipment 7 and 9 are generally illustrated as providing two independent AC power paths, many AC power distribution network configurations are possible (e.g., such as depending on the desired data center Tier), and DC power distribution architectures in accordance with various embodiments of the present disclosure are not limited by a particular configuration of AC power distribution from a utility into the data center 100.

AC nodes or buses 11 and 13 are coupled to AC/DC converters 10 which are configured to convert the AC power input to DC power. In this illustrative embodiment, four AC/DC converters 10 are depicted; however, various embodiments may comprise at least two AC/DC converters 10, preferably at least one corresponding to each AC feeder branch A and B (though alternative embodiments may not require independent AC feeds and/or may not require parallel active AC/DC converters 10 on independent AC feeds). It may also be understood that throughout a facility, such as data center 100, AC nodes or buses 11 and 13 may be distributed so as to feed additional AC/DC converters (not shown; e.g., implemented as AFEs) distributed throughout the facility to supply additional loads (not shown).

AC/DC converters 10 may be implemented as, for example, any known diode and controlled rectifier, active front end (AFE), or other circuit topology for converting AC voltage to DC. For instance, as known to those skilled in the art, an AFE provides for bidirectional power flow and generally comprises a front-side input filter (e.g., an L, LC, or LCL type) to remove high frequency current components and control the switching frequency ripple, followed by a configuration of active power switches (e.g., six switches for a two-level AFE) such as IGBTs (insulated gate bipolar transistors) or MOSFETs (metal-oxide-semiconductor field effect transistors) that are controlled based on a suitable pulse width modulation (PWM). By way of non-limiting example, in this illustrative embodiment, AC/DC converters 10 may be implemented as AFEs that convert a three-phase 400 V AC input to a nominal 700 V DC output.

As shown, for each AC/DC converter 10, the DC power output from the AC/DC converter 10 is coupled in parallel to parallel buses DCB1, DCB2, DCB3, DCB4 via respective protection devices 12, which are shown as comprising a switching device. More specifically, as further discussed below, in normal operation the switching device in each protection device 12 is closed such that the DC power (e.g., supplied at 700 V) output by all AC/DC converters 10 is supplied in parallel to the load devices 30 and 32 via buses DCB1, DCB2, DCB3, DCB4 and load combiners 20. This paralleling of the AC/DC converters 10 (also referred to herein as the DC sources) may be controlled, for example, according to droop compensation so as to provide for a nominal DC output voltage range on buses DCB1, DCB2, DCB3, DCB4 (e.g., 700 V plus or minus about 40 V) with current sharing among the DC sources.

In some embodiments, the protection devices 12 coupled to (e.g., such as integrated into and/or on one or more printed circuit boards or modules plugged into) a given AC/DC converter 10 (e.g., AFE) may each be coupled in parallel to a common rectifying output of the given AC/DC converter 10 (e.g., a common rectifier output of an AFE). In various alternative embodiments, AC/DC converter 10 (e.g., AFE) may comprise parallel-connected rectifiers having respective outputs that are coupled to respective ones of protection devices 12. In any such case, the current supplied by a given DC source 10 is shared among the buses DCB1, DCB2, DCB3, DCB4 that are coupled to the DC source via respective protection devices 12 that have their switches in the closed state.

Also shown is an optional backup power system comprising battery 14 coupled to a DC-to-DC converter 16, which is coupled to buses DCB1, DCB2, DCB3, DCB4 via protection devices 18. Protection devices 18 are essentially identical to protection devices 12, except that in normal operation of the power distribution system, the switches of power devices 18 are in the open state and may be switched to the closed state in the event that insufficient power to satisfy the load requirements is provided by the available DC sources 10.

Each protection device 12 (and 18) when in a closed state (i.e., having its switch in a state such that power from the DC source is supplied therethrough to a respective bus), rapidly detects a fault (e.g., short circuit) or overload on the corresponding bus DCB1, DCB2, DCB3, DCB4 to which it is coupled, and in response thereto rapidly switches to an open state. Protection devices 12 (and 18) thereby protect AC/DC converters 10 (and DC/DC converter), i.e., the DC power sources, in the event of a fault (e.g., short circuit) or overload condition on any of the DC buses DCB1, DCB2, DCB3, DCB4. By way of non-limiting example, each protection device 12 and 18 may detect and clear a fault (e.g., short circuit) condition within several milliseconds, and preferably within tens of microseconds, and more preferably in less than ten microseconds (e.g., several microseconds) of such fault event initiating. Likewise, by way of non-limiting example, each protection device 12 and 18 may detect an overload condition in less than ten microseconds (e.g., several microseconds or less) of such overload condition initiating, and may switch to an open state at a time after such detection that may be a function of the overload current magnitude, so as to provide protection against damage and/or failure that may be caused by overheating.

Figure 2A:
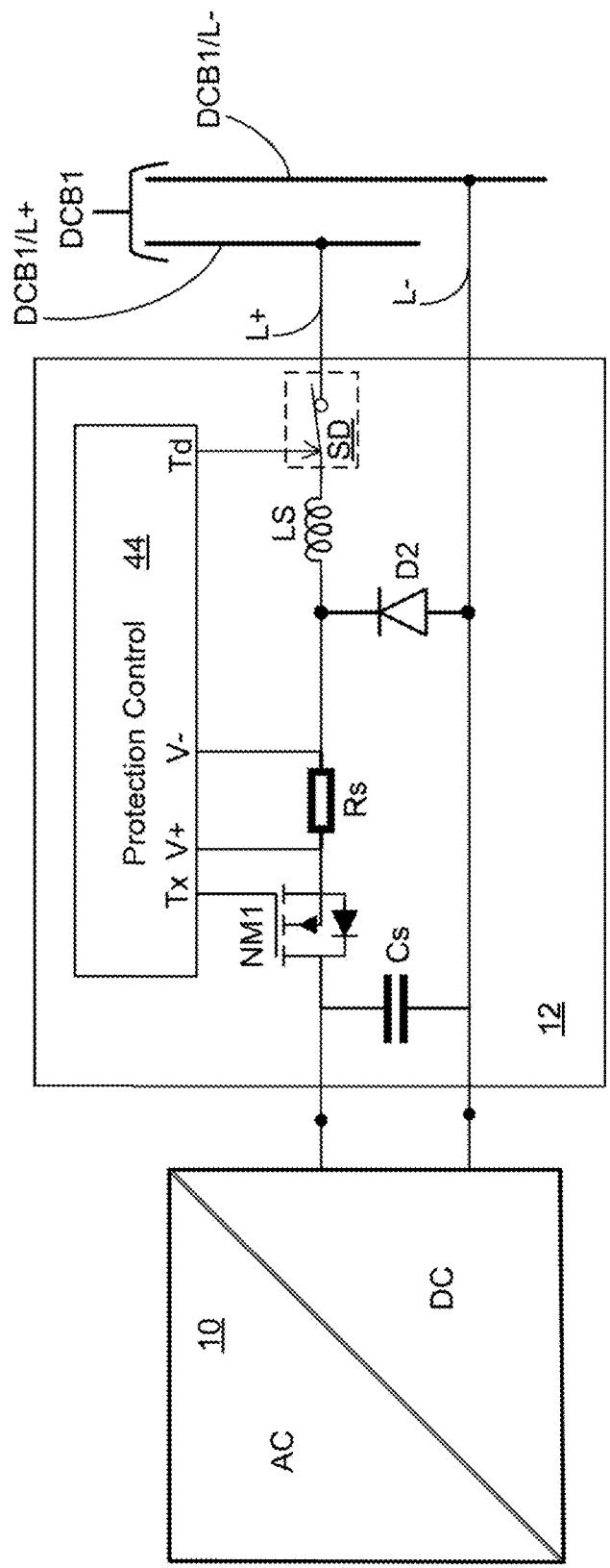
FIGS. 2A and 2B schematically depict respective illustrative embodiments of a protection device, in accordance with some embodiments.

FIG. 2A schematically depicts an illustrative embodiment of a protection device 12, in accordance with some embodiments. As shown, illustrative protection device 12 includes a capacitor Cs, a transistor NM1 (shown as a MOSFET or insulating gate FET), a sense impedance Rs (e.g., resistor), a diode D2, an inductor LS, a switching device SD, and a protection control circuit 44, and is configured to selectively couple the DC power (e.g., at 700 V) output by AC/DC converter 10 via positive line L+ and negative line L− to bus DCB1, which is shown as comprising a bus conductor DCB1/L+ and a bus conductor DCB1/L−. It may be understood that in various alternative embodiments, transistor NM1 may be implemented as an alternative solid state switching device, such as an IGBT (insulated gate bipolar transistor), that provides for high-speed switching (e.g., compared to, for example, an electromechanical relay or other electromechanical switching device).

Inductor LS is configured to ensure a gradual current increase in the event that a short circuit condition arises. It will be understood, however, that in various implementations the inductance of bus DCB1 may be sufficient such that inductor LS may be optional and, therefore, may not be included in various embodiments of protection device 12.

Capacitor Cs is coupled across the input port of protection device 12, which is coupled to a rectifier output of AC/DC converter 10 (e.g., AFE). In the event that a short-circuit occurs (e.g., on bus DCB1), capacitor Cs provides the short-circuit current required to trip the protection device. As such, the AC/DC converter 10 is not affected by and does not contribute to the short-circuit current. Diode D2 is coupled across the output port of protection device 12 and configured to act as a free-wheeling diode to, e.g., carry inductive current that may continue flowing (e.g., associated with the inductance LS and/or the inductance of the bus) in the event that transistor NM1 is switched open.

In some embodiments, switching device SD may be included to provide for additional isolation between AC/DC converter 10 and bus DCB1 in the event that transistor NM1 is switched to the open state in response to a fault or overload condition. More specifically, switching device SD is normally closed and may be switched to the open state after transistor NM1 has been opened and the free-wheeling current through diode D2 has decreased (or had an opportunity to decrease) below a nominal level (e.g., decreased to or below a negligible magnitude). More specifically, in various alternative embodiments, the time at which switching device SD is opened after NM1 has been opened may be determined based on measuring the free-wheeling current (e.g., using an additional sense resistor) and/or by measuring the change in the free-wheeling current (e.g., by measuring the voltage across inductor LS) and/or based on a minimum time delay after NM1 has been opened. Switching device SD may be implemented as, for example, an electromechanical switch (e.g., electromechanical relay).

Protection circuit 44 may be implemented, for example, as a microcontroller or other programmable processor (or other digital circuitry), and in some embodiments may also be communicably coupled to a host device (not shown) via a bus (e.g., using the Modbus protocol over a RS485 and/or using power-line communication (PLC)). In this illustrative embodiment, protection control circuit 44 may detect a fault or overload condition by sensing (e.g., monitoring) at sense inputs V+ and V− the voltage across impedance (e.g., resistor) Rs for transients or rapid changes (e.g., exceeding some threshold). Such transient or rapid-change detection may be implemented in various ways, such as by digitally calculating changes in the voltage and/or by other digital filtering and/or transform techniques, corresponding to identifying high rates of change in the time domain (e.g., di/dt) and/or high frequency components in the frequency domain (e.g., based on FFT, DCT, or other transform components). Alternatively or additionally, in some embodiments, such transient or rapid-change detection may be based on (e.g., at least in part) analog circuitry, such as an analog comparator that compares the voltage sensed across the V+ and V− inputs (i.e., across resistor RS) with a threshold/reference voltage level. For instance, in some embodiments, short circuit protection may be based on an analog comparator circuit responsive to the voltage sensed across the V+ and V− inputs, whereas overload protection may be based on digital processing of voltage(s) sensed (e.g., sampled) across the V+ and V− inputs. In some embodiments, impedance Rs (and/or another impedance) may be implemented as an inductance such that the measured voltage corresponds directly to di/dt. Alternatively or additionally, protection control circuit 44 may detect a fault or overload condition according to the sensed voltage across resistor Rs (and thus the corresponding current through resistor Rs) exceeding one or more threshold levels (e.g., a first threshold corresponding to an overload overcurrent condition; a second threshold corresponding to a short-circuit overcurrent condition).

In accordance with the foregoing description, based on the signal monitored (e.g., sensed or sampled) at sense inputs V+ and V−, protection control circuit 44 selectively controls (i) the state of transistor NM1 via output Tx which is coupled to the gate of transistor NM1, and (ii) the state of switching device SD via output Td. For instance, as described, upon detecting a short-circuit condition (e.g., based on an analog comparator), protection control circuit 44 rapidly turns off transistor NM1 and then turns off switching device SD after a minimum time delay (which may be a function of the measured short-circuit current magnitude) and/or after a measurement indicating that the free-wheeling current has decreased below a threshold level. Also, for example, upon detecting an overload condition, protection control circuit 44 may turn off transistor NM1 after a time delay that may be a function of the magnitude of the overload current, so as to prevent overheating of transistor NM1 that may cause degradation or failure thereof. More specifically, in various embodiments, at least one sample—and, e.g., possibly multiple, periodic samples—of an overload current may be digitally sampled by protection control circuit 44, and the time at which transistor NM1 will be turned off may be based on the magnitude(s) of the overload current sample(s) in view of pre-characterization of the power and/or energy dependent (e.g., current magnitude and/or duration dependent) heating and degradation properties of transistors corresponding to transistor NM1. In some embodiments, protection circuit 44 may incorporate a look-up table that is based on such pre-characterization and which may be referenced based on the sensed overload current sample(s) to determine the time at which transistor NM1 will be opened under an overload current condition.

Figure 2B:
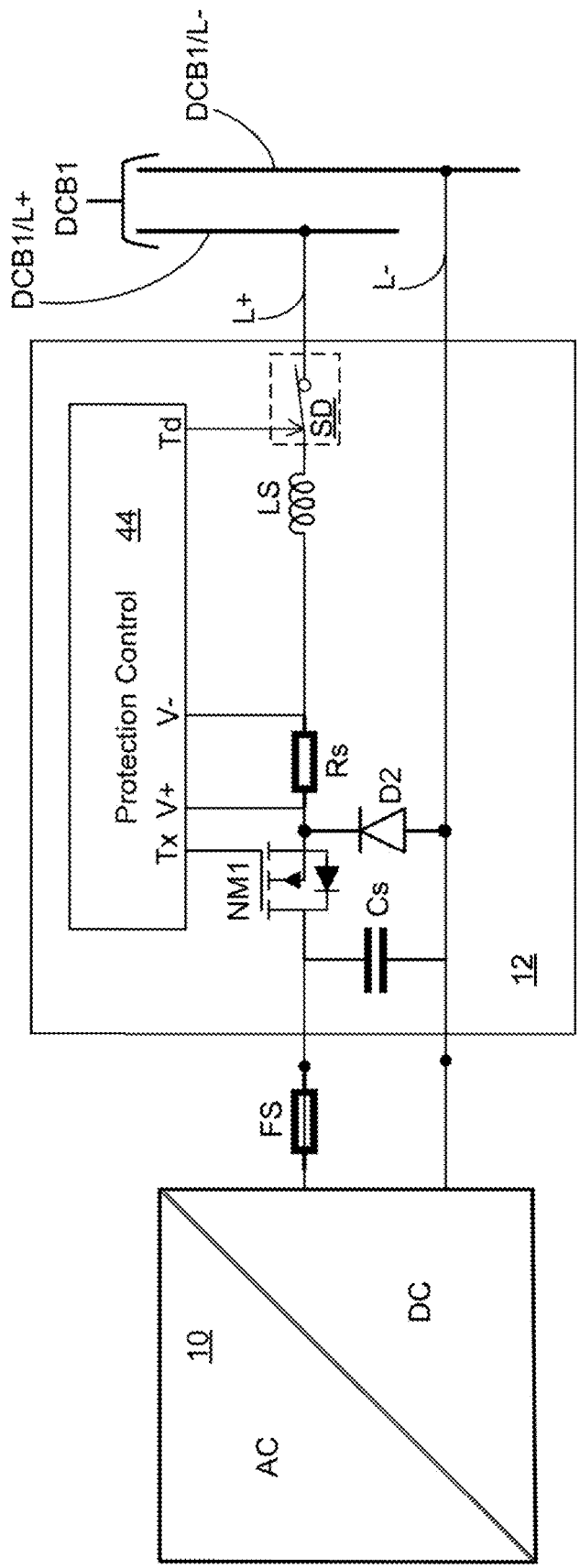

FIG. 2B illustrates an alternative illustrative embodiment of a protection device 12, in accordance with some embodiments. As shown, the illustrative embodiments of FIG. 2A and FIG. 2B are essentially identical, except for the position of diode D2 and the express depiction of a fuse FS in FIG. 2B. Compared to the FIG. 2A embodiment, the position of diode D2 in the illustrative embodiment of FIG. 2B may provide for improved protection, and also provides for protection circuit 44 to sense the free-wheeling current through diode D2 (i.e., after opening NM1) by sensing the voltage across the V+ and V− inputs (i.e., across resistor RS), thus facilitating control over opening of switch SD (e.g., after the sensed free-wheeling current has decreased below a nominal threshold value). Fuse FS provides for protection against source faults (e.g., a short circuit in DC/DC converter). It will be understood that such a fuse FS typically may be incorporated in AC/DC converter 10 (e.g., such as in the embodiment of FIG. 2A), or in some embodiments may be incorporated into protection device 12.

Although each protection device 12 in the illustrative embodiments of FIGS. 2A and 2B may be implemented as a separate module with respective protection control circuit 44, in some embodiments a common controller may be configured to control the operation (e.g., sensing and switching) of each protection device 12 corresponding to a given AC/DC converter 10. It will also be understood that while the illustrative protection devices of FIGS. 2A and 2B are configured to provide unidirectional protection, protecting the AC/DC converter 10 from faults on the DC bus, various alternative embodiments may employ a bi-directional protection device (e.g., similar to the unidirectional protection device of FIG. 2A or 2B and comprising an additional source-side solid state switching device under control of protection circuit 44) that also rapidly detects and clears any source-side faults (e.g., a short circuit in the AC/DC converter 10), preventing such faults from propagating to the DC bus. In various embodiments, however, the illustrative unidirectional protection device 12 of FIG. 2A or 2B may be adapted to provide bidirectional protection by configuring protection circuit 44 to (i) detect source-side faults (e.g., a short circuit) according to the voltage sensed across inputs V+ and V− (i.e., across resistor RS) and (ii) open switch SD in the event that such a fault is detected. For example, a short circuit fault in AD/DC converter 10 may be detected based on an analog comparator sensing a negative voltage drop from V+ to V− (a positive drop from V− to V+) having a magnitude exceeding a threshold. To provide for fast switching, switch SD may be implemented as a solid state device (e.g., a semiconductor transistor, such as a MOSFET configured so that its body diode opposing that of transistor NM1), though in some embodiments switch SD may be implemented as an electromechanical relay.

Referring again to FIG. 1, while this illustrative embodiment implements four DC buses DCB1, DCB2, DCB3, DCB4, alternative embodiments may implement any number of two or more DC buses, similarly configured with each bus coupled to each DC source via a respective protection device. As described, load current is shared among the DC buses. As such, DC power distribution via the buses may be provided with lower $I^2R$ losses associated with the buses compared to, e.g., distributing the power along a single DC bus. And because each bus is coupled to each DC source by a respective protection device, such a configuration of a plurality of buses sharing the load power also provides additional selectivity and redundancy at least insofar as a fault on any given bus will result in that given bus being isolated from the DC sources, which will continue to supply the required load power via the other buses that have not experienced a fault.

It will also be understood (e.g., in view of FIG. 2A or 2B) that while FIG. 1 depicts the power distribution architecture essentially according to a single-line diagram, each DC bus DCB1, DCB2, DCB3, DCB4 in this illustrative embodiment actually comprises two conductors, a so-called positive conductor (L+) and a so-called negative (or return) conductor (L−), which are each coupled to corresponding protection devices 12 and 18. In some embodiments, DC buses DCB1, DCB2, DCB3, DCB4 may be implemented as conductive cables and/or bus bars (e.g., overhead bus bars distributed throughout the data center (facility) 100 with drops to load combiners 20). It will also be understood that although not explicitly depicted in FIG. 1, the illustrative DC distribution network of FIG. 1 includes an earthing system (e.g., a TN-S arrangement). And, in an earthing configuration wherein the negative conductors (L−) of the herein depicted illustrative two-wire DC bus embodiments may be grounded, the L− conductors may be labeled as so-called "M" conductors (e.g., in accordance with the International Electrotechnical Commission (IEC) labeling), although they are not labeled as "M" conductors in the herein figures. In view of the present disclosure it will also be understood that alternative embodiments of a DC distribution architecture may comprise DC buses implemented as, for example, three-wire earthed bipolar circuits (e.g., comprising positive (L+), mid-wire (M), and negative (L−) conductors).

As indicated above, in regular operation, power is supplied in parallel to each of the load combiners 20 from each of the DC sources 10 via each of the protection devices 12 and each of the DC buses DCB1, DCB2, DCB3, DCB4. Each load combiner 20 includes a protection device and provides the power supplied from each of the buses to the loads 30 and 32 via one or more step down converters that steps the bus voltage level (e.g., 700 V) down to a voltage level suitable for the loads 30 and 32 (e.g., 48 V). As understood by those skilled in the art, loads 30 and 32 may also comprise one or more step-down converters (not shown herein) for further reducing this stepped-down voltage (e.g., 48 V) to one or more lower voltages.

Figure 3:
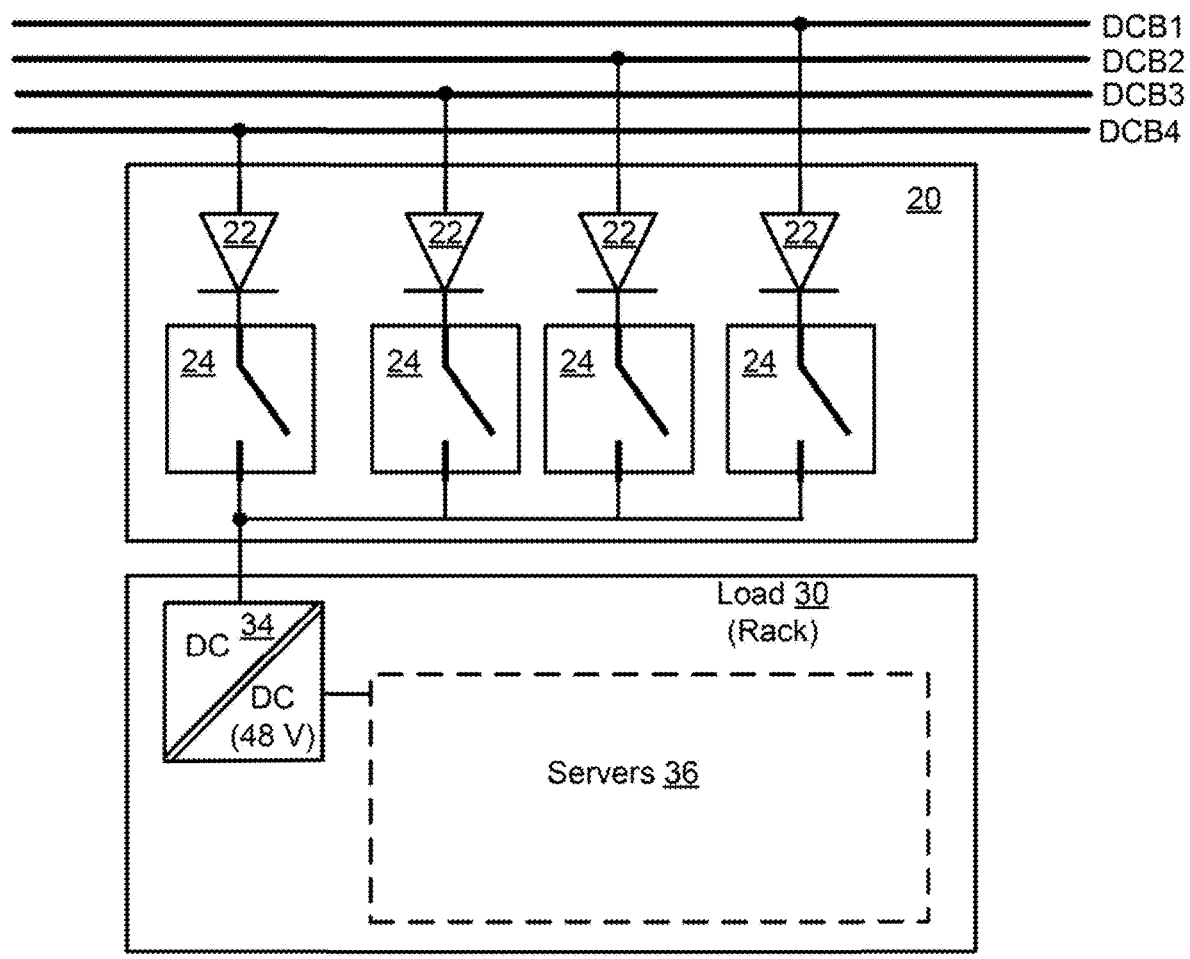
FIGS. 3 through 7 schematically depict various illustrative alternative embodiments of a load combiner, in accordance with some embodiments.
Figure 4:
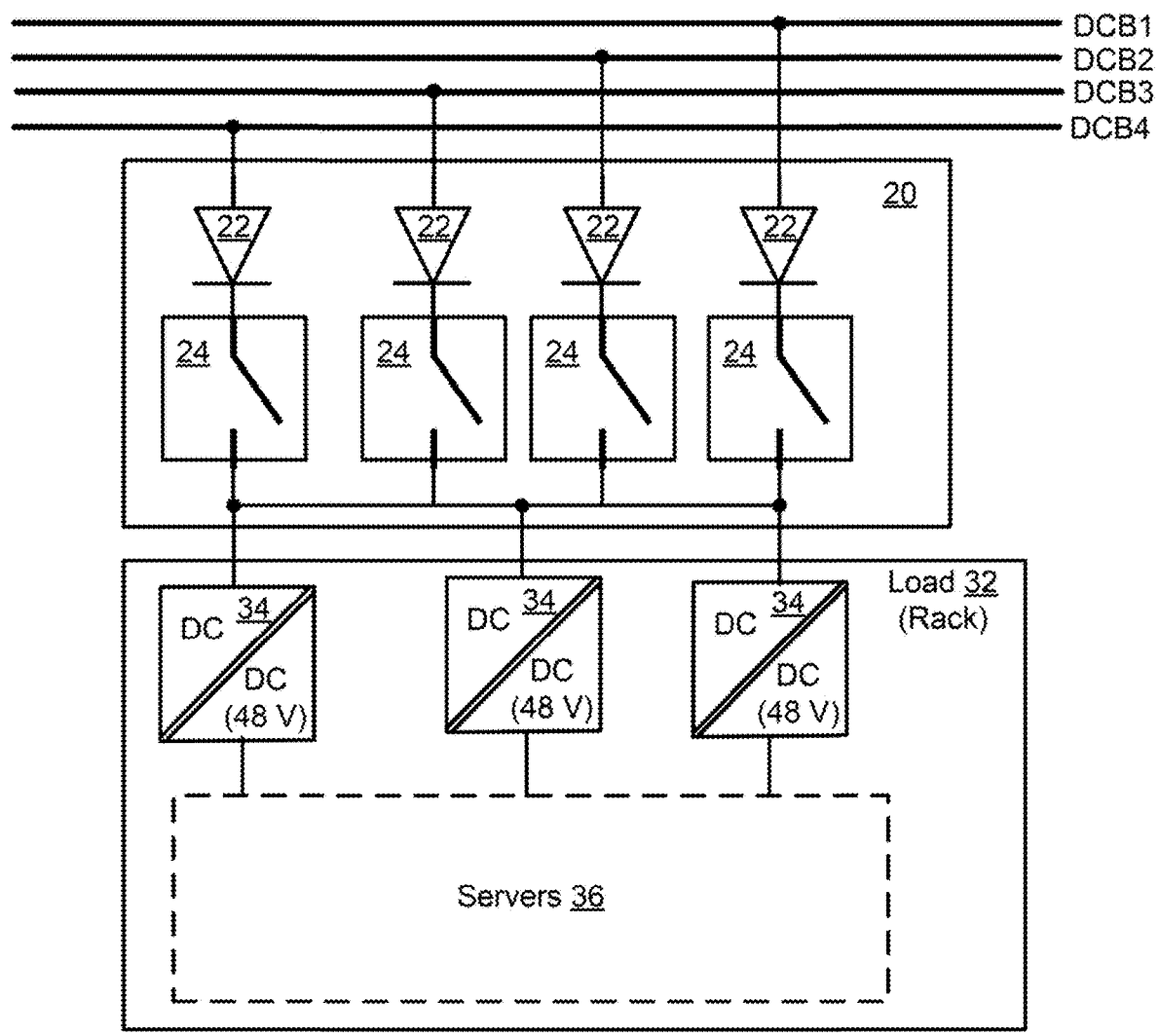

FIG. 3 schematically depicts an illustrative embodiment of (i) a load combiner 20 comprising diodes 22 and load protection devices 24, and (ii) a load 30 comprising, e.g., a rack or cabinet that includes at least one DC/DC converter 34 and servers 36. More specifically, as shown, each diode 22 is coupled to a respective bus DCB1, DCB2, DCB3, DCB4 and in series with a respective protection device 24, each of which includes a switching device that is in the closed state under normal operating conditions (e.g., no faults or overloads detected). The four branches of series-connected diodes 22 and load protection devices 24 are OR-connected to provide an output to DC/DC converter 34.

Accordingly, in normal operation with the switch of each of the load protection devices 24 in the closed state, power supplied by each of the sources 10 in parallel via buses DCB1, DCB2, DCB3, DCB4 is combined at the input of DC/DC converter 34 which steps down the bus voltage level (e.g., nominally 700 V) to a very low level (e.g., to 48 V) usable by the load equipment (e.g., servers 36), which, as noted, may comprise additional DC/DC converters for further stepping down the voltage. In the event that a fault (e.g., short-circuit) condition is detected on a given branch of series-connected diodes 22 and load protection devices 24, the corresponding switch is rapidly opened to isolate the fault in the so-called downstream region (e.g., toward the load) and prevent it from propagating in the so-called upstream direction from the load combiner 20 via the bus toward the source, where it may cause each protection device 12 coupled to the corresponding bus to switch to an open state, thus disabling power distribution via the corresponding bus. Similarly, in the event that an overload condition is detected on a given branch of series-connected diodes 22 and load protection devices 24, the corresponding switch may be opened after a time interval based on, for example, the overload current magnitude, so as to provide protection against damage and/or failure that may be caused by overheating (e.g., damage to solid state devices within the protection device 24 and/or to the corresponding diode 22).

In this regard, each load protection device 24, which may be configured similarly to source protection devices 12 and 18, rapidly detects faults (e.g., short circuit) on the load side, and in response thereto rapidly switches to an open state, so as to provide selectivity. By way of example, each protection device 24 may detect and clear a fault (e.g., short circuit) within several milliseconds, and preferably within tens of microseconds, and more preferably in less than ten microseconds (e.g., several microseconds) of such fault event initiating. Likewise, by way of non-limiting example, each protection device 24 may detect an overload condition in less than ten microseconds (e.g., several microseconds or less) of such overload condition initiating, and may switch to an open state at a time after such detection that is a function of the overload current magnitude, so as to provide protection against damage and/or failure that may be caused by overheating. It will also be understood that a fault (e.g., short circuit) or overload condition associated with the load corresponding to a given load combiner 20 will typically result in each of the protection devices 24 of the given load combiner 20 switching to the open state, though not necessarily simultaneously, as the overcurrent (e.g., short circuit or overload current), like the current under normal operating conditions, may not be equally shared among the branches of load combiner 20.

FIGS. 4 through 7 schematically depict various illustrative alternative embodiments of a load combiner 20 and DC/DC converters 34, as may be implemented in connection with load equipment (e.g., rack or cabinet) 30 or 32. As shown, in FIG. 4, the combined output of load combiner 20 is provided to a plurality (in this case, three) of DC/DC converters 34 that provide a stepped-down voltage supply output to servers 36. In some implementations, such a configuration may be employed to provide redundancy of DC/DC converters 34.

Figure 5:
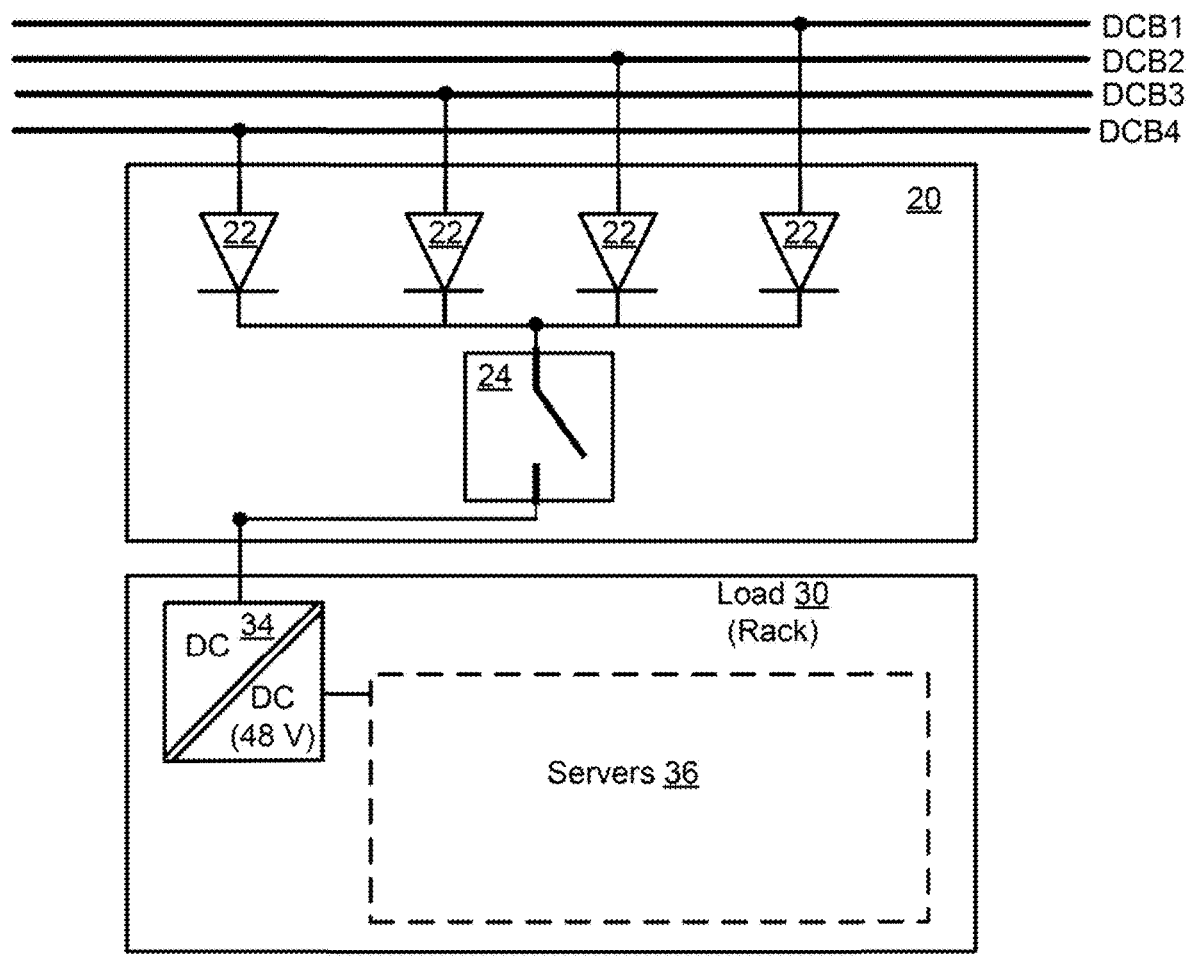
Figure 6:
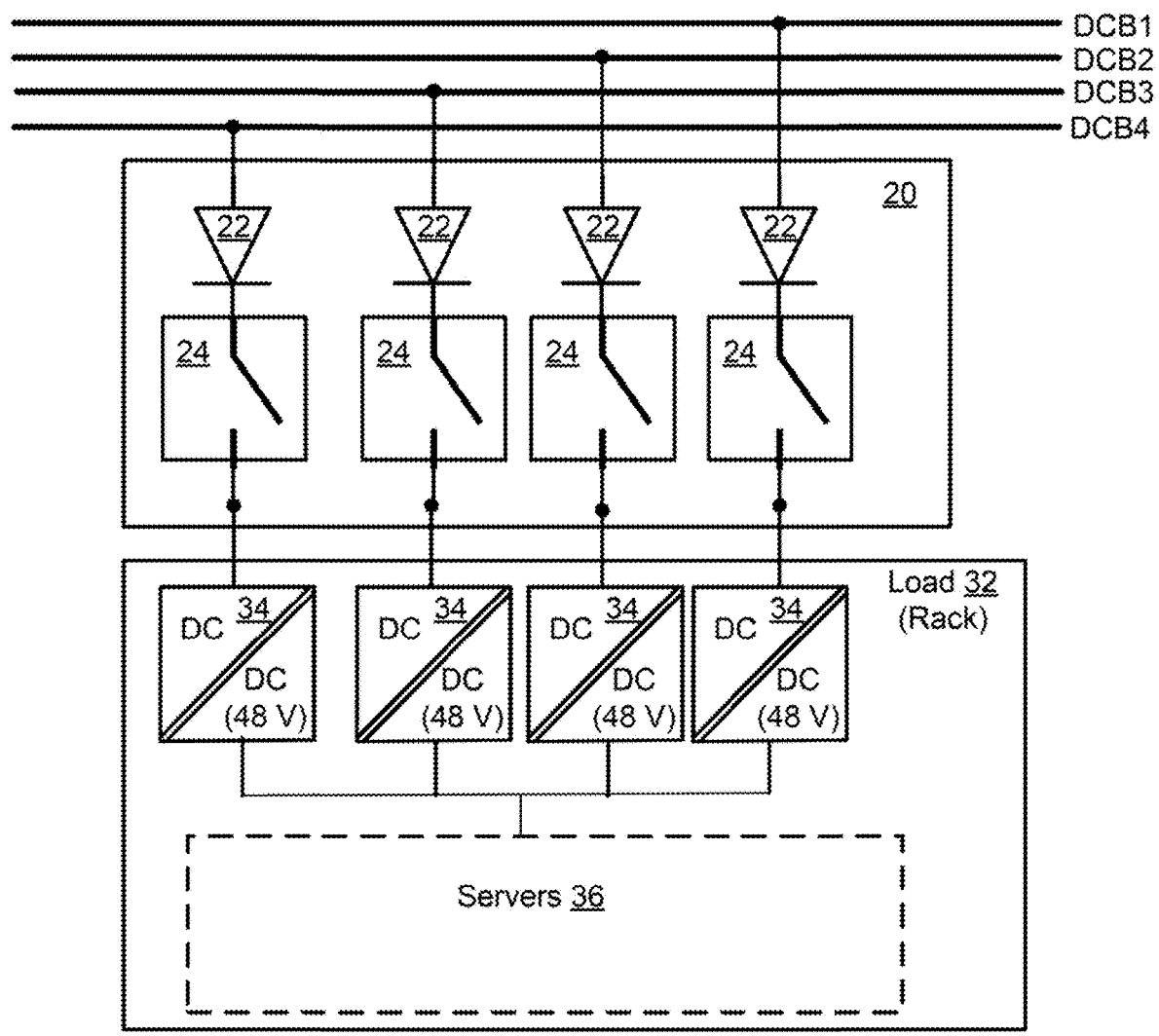
Figure 7:
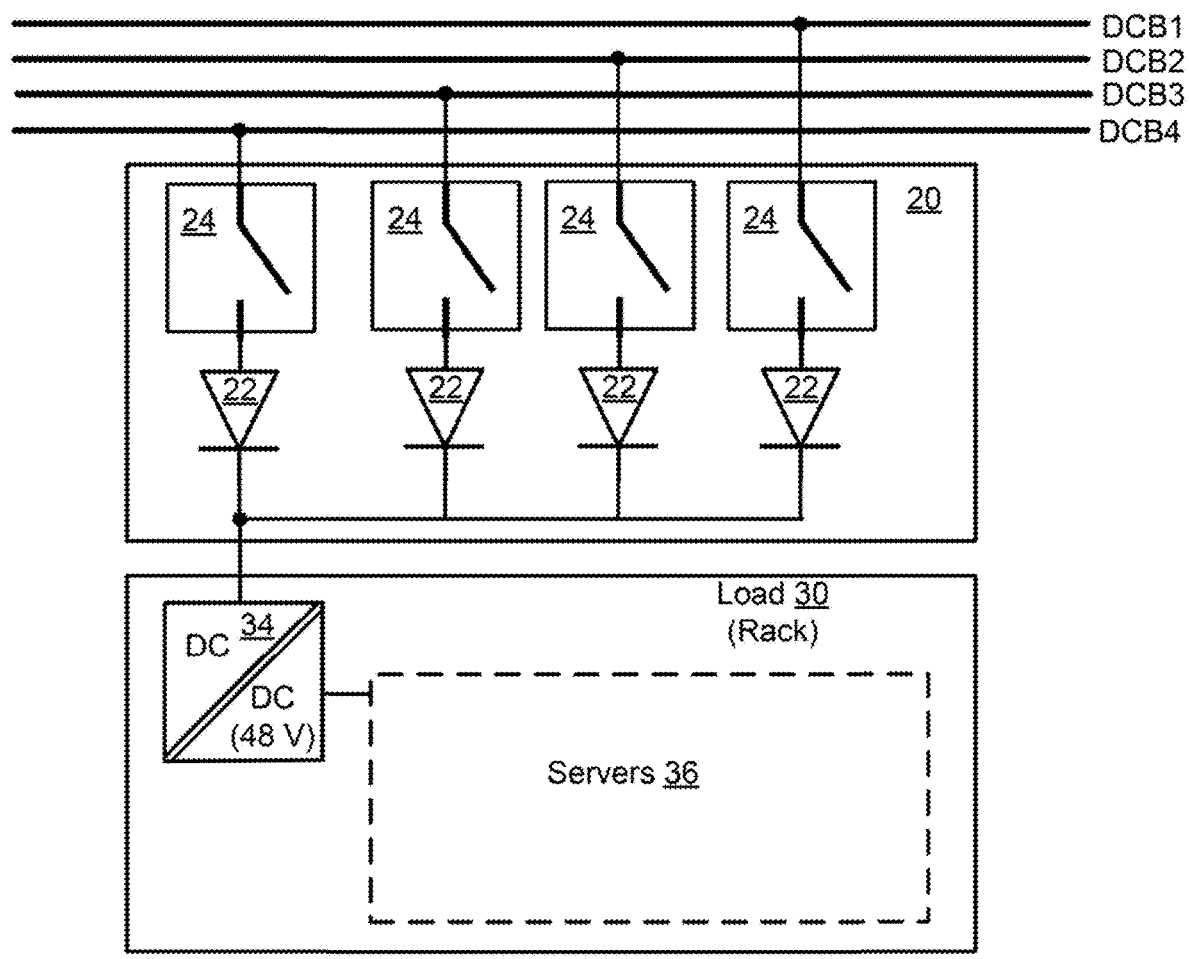

In FIG. 5, rather than implementing parallel branches comprising series-connected diodes and protection devices 24, load combiner 20 comprises a single protection device 24 coupled to the diode-OR-ed output of diodes 22. It will be understood, however, that in various embodiments in accordance with FIG. 5, the switching element may be implemented as an individual switch device (e.g., a MOSFET or IGBT) or as a plurality of parallel connected switching devices under common control (e.g., parallel MOSFETs with gates connected together). And in FIG. 6, rather than combining (e.g., OR-ing) the outputs of the respective branches of load combiner 20, each such branch is connected to a respective DC/DC converter 34, and the respective outputs of these converters 34 are combined (e.g., according to droop control) to supply power to servers 36, thus providing for redundancy of DC/DC converters 34 in some implementations. FIG. 7 schematically depicts a topology equivalent to that of FIG. 3, wherein the order of the series-connected diode 22 and protection device 24 in each branch is reversed with respect to the bus and DC/DC converter nodes.

It will be understood that for ease of reference and clarity of exposition, the illustrative load combiners 20 of FIGS. 3 through 7 are depicted as a block diagram and do not show all circuit elements that may be included in practice. In addition, those skilled in the art will understand that in various alternative embodiments, the load combiner 20 may be configured so as to also comprise the DC/DC converters 34, rather than the DC/DC converters being configured as part of the loads 30 and 32 (e.g., racks or cabinets).

Figure 8A:
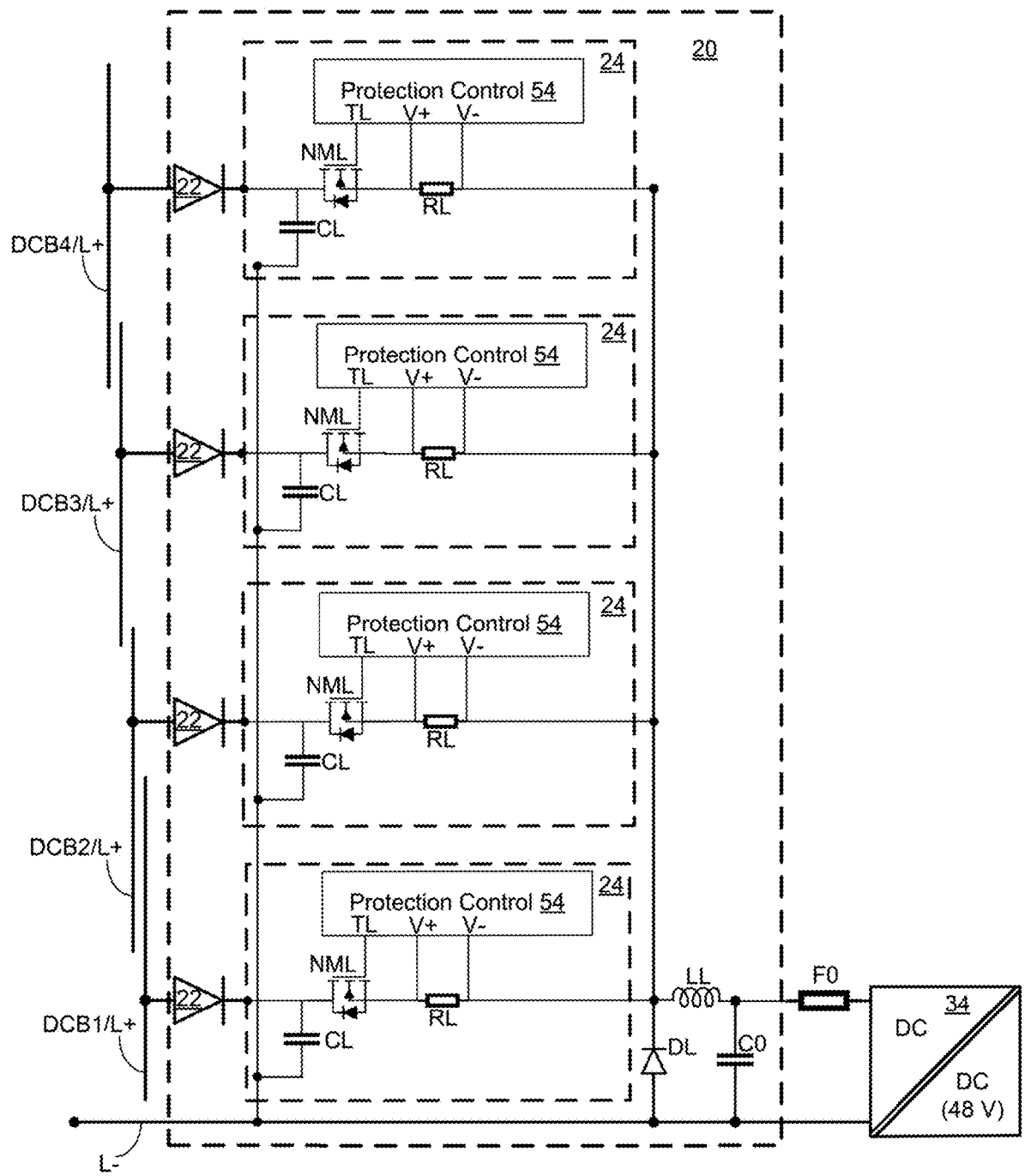
FIGS. 8A and 8B schematically depict respective illustrative embodiments of a load combiner corresponding to the configuration of the load combiner of FIG. 3, in accordance with some embodiments.

FIG. 8A schematically depicts additional circuitry details of an illustrative load combiner 20 corresponding to the configuration of the load combiner 20 of FIG. 3, in accordance with some embodiments. As shown, each parallel branch of load combiner 20 comprises a similarly configured protection device 24 coupled with a respective diode 22 that is coupled to a respective one of positive bus conductors DCB1/L+, DCB2/L+, DCB3/L+, DCB4/L+ corresponding to buses DCB1, DCB2, DCB3, DCB4, respectively. The respective outputs of the protection devices 24 are coupled together as a common node that is coupled to an input of DC/DC converter 34 via a filter network comprising an inductor LL and a capacitor CO. For instance, inductor LL is configured to ensure a gradual current increase, while capacitor CO is configured as a shunt to smooth voltage variations (and in some implementations also provide for overvoltage protection), in the event that an overcurrent (e.g., short circuit or overload) or other fault condition arises on the load side. Also, as shown, a fuse FO may be coupled between the filter network output and the DC/DC converter input. In various embodiments, fuse FO may be included in the DC/DC converter itself, or as a component of load combiner 20. The rated current of fuse FO may be selected according to the nominal current conducted by DC/DC converter 34, while the i-squared-t rating of fuse FO may be selected such that fuse FO will not trip before MOSFETs NML of protection devices 24 under an overcurrent (e.g., short circuit or overload) condition as defined (e.g., according to the protection control circuit 54) within any given branch of load combiner 20.

More specifically, each illustrative protection device 24 includes a capacitor CL, a transistor NML (shown as a MOSFET or insulating gate FET), a sense impedance RL (e.g., resistor), and a protection control circuit 54, and is configured to selectively couple DC power from a respective one of buses DCB1, DCB2, DCB3, DCB4 to a load (not shown) that is coupled to the output of DC/DC converter 34, thereby conducting a portion of the load current at a nominal bus voltage (e.g., nominally 700 V)), while providing protection against short circuit, overload, or other faults that may occur in DC/DC converter 34 and/or in a load (not shown) coupled to the output of the DC/DC converter 34.

Protection circuit 54 may be implemented similarly to protection circuit 44. For instance, protection circuit 54 may be implemented as a microcontroller or other programmable processor (or other digital circuitry), and in some embodiments may also be communicably coupled to a host device (not shown) via a bus (e.g., using the Modbus protocol over a RS485 and/or using power line communication (PLC)). In this illustrative embodiment, protection control circuit 54 may detect a fault or overload condition by sensing (e.g., monitoring) at sense inputs V+ and V− the voltage across impedance (e.g., resistor) RL for transients or rapid changes (e.g., exceeding some threshold). Such transient or rapid-change detection may be implemented in various ways, such as by digitally calculating changes in the voltage and/or by other digital filtering and/or transform techniques, corresponding to identifying high rates of change in the time domain (e.g., di/dt) and/or high frequency components in the frequency domain (e.g., based on FFT, DCT, or other transform components). Alternatively or additionally, in some embodiments, such transient or rapid-change detection may be based on (e.g., at least in part) analog circuitry, such as an analog comparator that compares the voltage sensed across the V+ and V− inputs (i.e., across resistor RS) with a threshold/reference voltage level. For instance, in some embodiments, short circuit protection may be based on an analog comparator circuit responsive to the voltage sensed across the V+ and V− inputs, whereas overload protection may be based on digital processing of voltage(s) sensed (e.g., sampled) across the V+ and V− inputs. In some embodiments, impedance RL (and/or another impedance) may be implemented as an inductance such that the measured voltage corresponds directly to di/dt. Alternatively or additionally, protection control circuit 54 may detect a fault or overload condition according to the sensed voltage across resistor RL (and thus the corresponding current through resistor RL) exceeding one or more threshold levels (e.g., a first threshold corresponding to an overload overcurrent condition; a second threshold corresponding to a short-circuit overcurrent condition).

In accordance with the foregoing description, based on the signal monitored (e.g., sensed or sampled) at sense inputs V+ and V−, protection control circuit 54 selectively controls the state of transistor NML via output TL which is coupled to the gate of transistor NML. For instance, upon detecting a short-circuit condition (e.g., based on an analog comparator), protection control circuit 54 rapidly turns off transistor NML. And upon detecting an overload condition, protection control circuit 54 may turn off transistor NML after a time delay that may be a function of the magnitude of the overload current, so as to prevent overheating of transistor NML that may cause degradation or failure thereof. More specifically, in various embodiments, at least one sample—and, e.g., possibly multiple, periodic samples—of an overload current may be digitally sampled by protection control circuit 54, and the time at which transistor NML will be turned off may be based on the magnitude(s) of the overload current sample(s) in view of pre-characterization of the power and/or energy dependent (e.g., current magnitude and/or duration dependent) heating and degradation properties of transistors corresponding to transistor NML. By way of non-limiting example, in some implementations a short-circuit condition may be specified as nominally twice the nominal current supplied to converter 34 for supplying the load power under normal operating conditions.

Capacitor CL is coupled across the input port of protection circuit 24; particularly, CL is coupled between the cathode of diode 22 and a negative bus conductor L−, which is conductively coupled (not shown) to the negative bus conductor of each DC bus DCB1, DCB2, DCB3, DCB4. In the event that a short-circuit occurs on the load side (e.g., in the load coupled to DC/DC converter 34), capacitor CL provides the short-circuit current required to trip the protection device 24. As such, the short-circuit condition does not propagate through diode 22 via the DC bus to the protection devices 12 associated with sources 10. Thus, a load-side fault (e.g., short circuit) will not cause tripping of source-side protection devices (nor damage to the DC bus or other upstream components). In other words, each protection device 24 isolates a load-side short-circuit fault to the load side, thereby providing complete selectivity.

Diode DL is coupled between the common output node of protection circuits 24 and negative bus conductor L−, and is configured to act as a free-wheeling diode to, e.g., carry inductive current that may continue flowing (e.g., associated with the inductance LL) in the event that one or more of transistors NML are switched open.

In some embodiments, each protection circuit 24 may include an additional switching device similar to switching device SD in protection device 12 of FIGS. 2A and 2B, to provide for additional isolation of the DC buses DCB1, DCB2, DCB3, DCB4 (and the source-side protection devices 12) from the load-side components (e.g., DC/DC converter 34 and/or the load couple thereto) in the event that transistor NML is switched to the open state in response to a fault or overload condition.

Figure 8B:
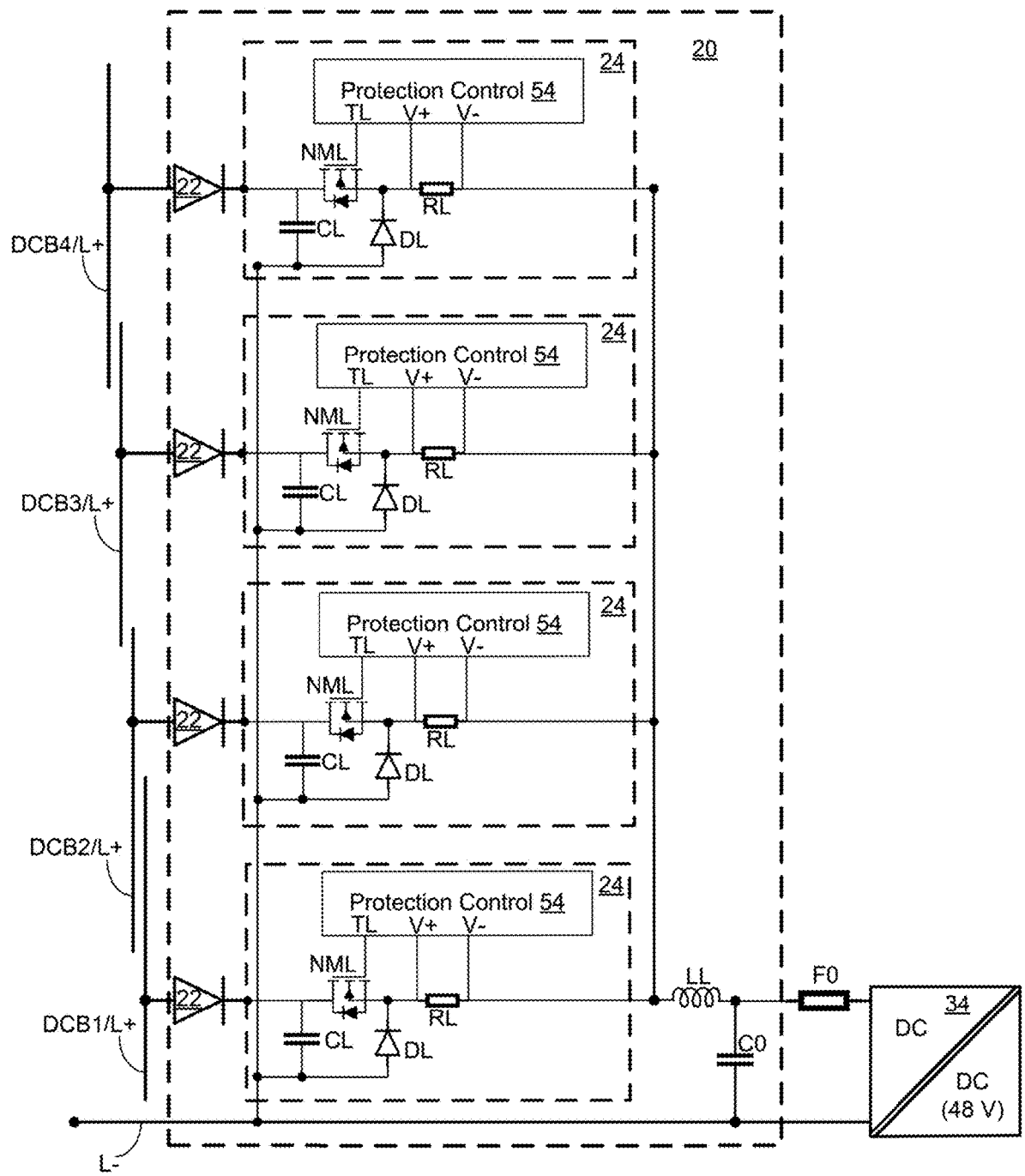

FIG. 8B illustrates an alternative illustrative embodiment of a protection device 24, in accordance with some embodiments. As shown, the illustrative embodiments of FIG. 8A and FIG. 8B are essentially identical, except that in FIG. 8A free-wheeling diode DL is implemented as a common diode element with respect to the four branches, whereas in FIG. 8B each of the four branches includes a respective free-wheeling diode DL disposed adjacent to transistor NML. Compared to the FIG. 8A embodiment, the position of diodes DL in the illustrative embodiment of FIG. 8B may provide for improved protection, and also provides for protection circuit 54 to sense the free-wheeling current through diode DL (i.e., after opening NML) by sensing the voltage across the V+ and V− inputs (i.e., across resistor RL).

Although each protection device 24 in the illustrative embodiments of FIGS. 8A and 8B may be implemented as a separate module with respective protection control circuit 54, in some embodiments a common controller (e.g., embracing the functionality of each protection control circuit 54) may be configured to control the operation (e.g., sensing and switching) of each protection device 24 corresponding to a given branch of load combiner 20.

In view of the foregoing disclosure, it will be understood in connection with the illustrative embodiment of FIG. 1 that in normal operation the loads 30 and 32 are each actively supplied by all four DC sources 10 in parallel via the parallel buses DCB1, DCB2, DCB3, DCB4 and the load combiners 20. And in the event that any one of DC sources 10 fails, its associated protection devices 12 will switch to the open state and the remaining DC sources 10 will continue to supply, in parallel, the power required by loads 30 and 32 via each of DC buses DCB1, DCB2, DCB3, DCB4.

The number of AC/DC converters 10 and their respective power capacity (which may be equal, or one or more may differ, in various embodiments) may be selected in accordance with a desired source redundancy based on the load power requirements. For instance, for purposes of illustration, assuming that the illustrative embodiment of FIG. 1 comprises only the four AC/DC converters shown, and the load requirements by loads 30 and 32 is power PL, then N+1 redundancy (3+1 in this example) may be provided by providing each AC/DC converter 10 with a power capacity of at least PL/3 and less than PL/2. In normal operation, all four DC sources share the load power PL, each DC source thus supplying a nominal power of PL/4. If any of the four DC sources is disconnected (e.g., due to failure), then the remaining three DC sources will supply the load power PL, each of the three DC sources providing nominally a power of PL/3 over buses DCB1, DCB2, DCB3, DCB4.

Alternatively, based on the same illustrative configuration of FIG. 1, N+2 redundancy (i.e., 2+2 in the specific example of four AC/DC converters) may be provided by configuring each AC/DC converter 10 with a power capacity of at least PL/2 and less than PL. If any two of the four DC sources are disconnected (e.g., due to failure), then the remaining two DC sources will supply the load power PL, each of the two DC sources providing nominally a power of PL/2 over buses DCB1, DCB2, DCB3, DCB4.

And yet in an alternative implementation based on the same illustrative configuration of FIG. 1, N+3 redundancy (i.e., 1+3 in the specific example of four AC/DC converters) may be provided by configuring each AC/DC converter 10 with a power capacity of at least PL. If any three of the four DC sources are disconnected (e.g., due to failure), then the remaining DC source will supply the load power PL over buses DCB1, DCB2, DCB3, DCB4.

In view of the foregoing disclosure in connection with the illustrative embodiment of FIG. 1, it will also be understood that in addition to providing for such active, parallel source redundancy, the illustrative configuration comprising sources 10, protection devices 12, and parallel buses DCB1, DCB2, DCB3, DCB4 also provides for bus redundancy such that the loads 30 and 32 may continue to be supplied with full load power in the event of a fault (e.g., short circuit) condition on at least one of the DC buses.

For instance, in the event of a fault condition (e.g., short circuit) on any one of buses DCB1, DCB2, DCB3, DCB4, the corresponding protection device 12 of each source 10 that is coupled to the faulty DC bus will rapidly switch to the open state, and the corresponding diode 22 (coupled to the faulty bus) of load combiners 20 will not conduct short-circuit current, the faulty bus thus being isolated from the sources 10 and the loads 30 and 32. The sources 10 will, however, continue to provide total load power PL to loads 30 and 32 via the remaining three buses and via the corresponding branches of load combiners 30 and 32, with each source 10 continuing to provide nominally PL/4 and each of the three buses providing a nominal power of PL/3.

Similarly, in some embodiments, in the event of a fault condition (e.g., short circuit) on any two of buses DCB1, DCB2, DCB3, DCB4, the corresponding protection devices 12 of each source 10 that is coupled to the faulty DC buses will rapidly switch to the open state, and the corresponding diodes 22 (coupled to the faulty buses) of load combiners 20 will not conduct short-circuit current, the faulty buses thus being isolated from the sources 10 and the loads 30 and 32. The sources 10 will, however, continue to provide total load power PL to loads 30 and 32 via the remaining two buses and via the corresponding branches of load combiners 30 and 32, with each source 10 continuing to provide nominally PL/4 and each of the two buses providing a nominal power of PL/2.

And likewise, in some embodiments, in the event of a fault condition (e.g., short circuit) on any three of buses DCB1, DCB2, DCB3, DCB4, the corresponding protection devices 12 of each source 10 that is coupled to the faulty DC buses will rapidly switch to the open state, and the corresponding diodes 22 (coupled to the faulty buses) of load combiners 20 will not conduct short-circuit current, the faulty buses thus being isolated from the sources 10 and the loads 30 and 32. The sources 10 will, however, continue to provide total load power PL to loads 30 and 32 via the remaining single bus and via the corresponding branches of load combiners 30 and 32, with each source 10 continuing to provide nominally PL/4 and the single bus providing a nominal power of PL.

It will be understood that in various embodiments of a DC power distribution network comprising an integer number (K) of DC buses coupling power from DC sources (e.g., sources 10) to loads (e.g., loads 30 and 32) via load combiners (e.g., load combiners 20), the distribution network may be configured to limit the minimum number (M) of buses that may provide full power PL to the loads (via load combiners) in the event of a fault on one or more of the K buses. In some embodiments, such minimum number of buses, M, may be greater than one and may be dependent on, for example, the current carrying capacity of the individual buses.

For instance, in some implementations, considering factors such as cost, number of buses, and bus fault probability, each of the buses may be selected or specified to have a maximum current capacity that is less than the maximum nominal load current (corresponding to the maximum nominal load power, PL). By way of example, in the illustrative embodiment of FIG. 1, each bus DCB1, DCB2, DCB3, DCB4 may be configured to carry a maximum current corresponding to a power of at least about PL/2 but less than PL. In such a case, maximum nominal load power PL may be provided on no less than two buses in the event of fault conditions on one or more of the buses. Thus, in some embodiments corresponding to such an illustrative case, control of the sources 10 and/or protection devices 12 may be configured to power down the sources and/or disconnect the sources from all buses in the event of fault on three of the buses. In some embodiments corresponding to such an illustrative case, however, load shedding may be selectively performed in the event of fault on three of the buses, so that the power demanded by the loads corresponds to no more than the maximum current carrying capacity of the remaining bus, which may thus remain active to supply power to such loads.

As may be further understood in view of the foregoing disclosure, in view of the protection and selectivity provided by protection devices 12 associated with the sources and by load combiner protection devices 24 associated with the loads, no additional protection devices (e.g., breakers, fuses) or associated components (e.g., distribution panels) may be required between the sources and the load combiners. As such, buses DCB1, DCB2, DCB3, DCB4 may be readily provided as bus bars, which may provide for reduced cost as well as ease of distribution and connection/coupling to components (e.g., load combiners, protection devices 12).

Figure 9:
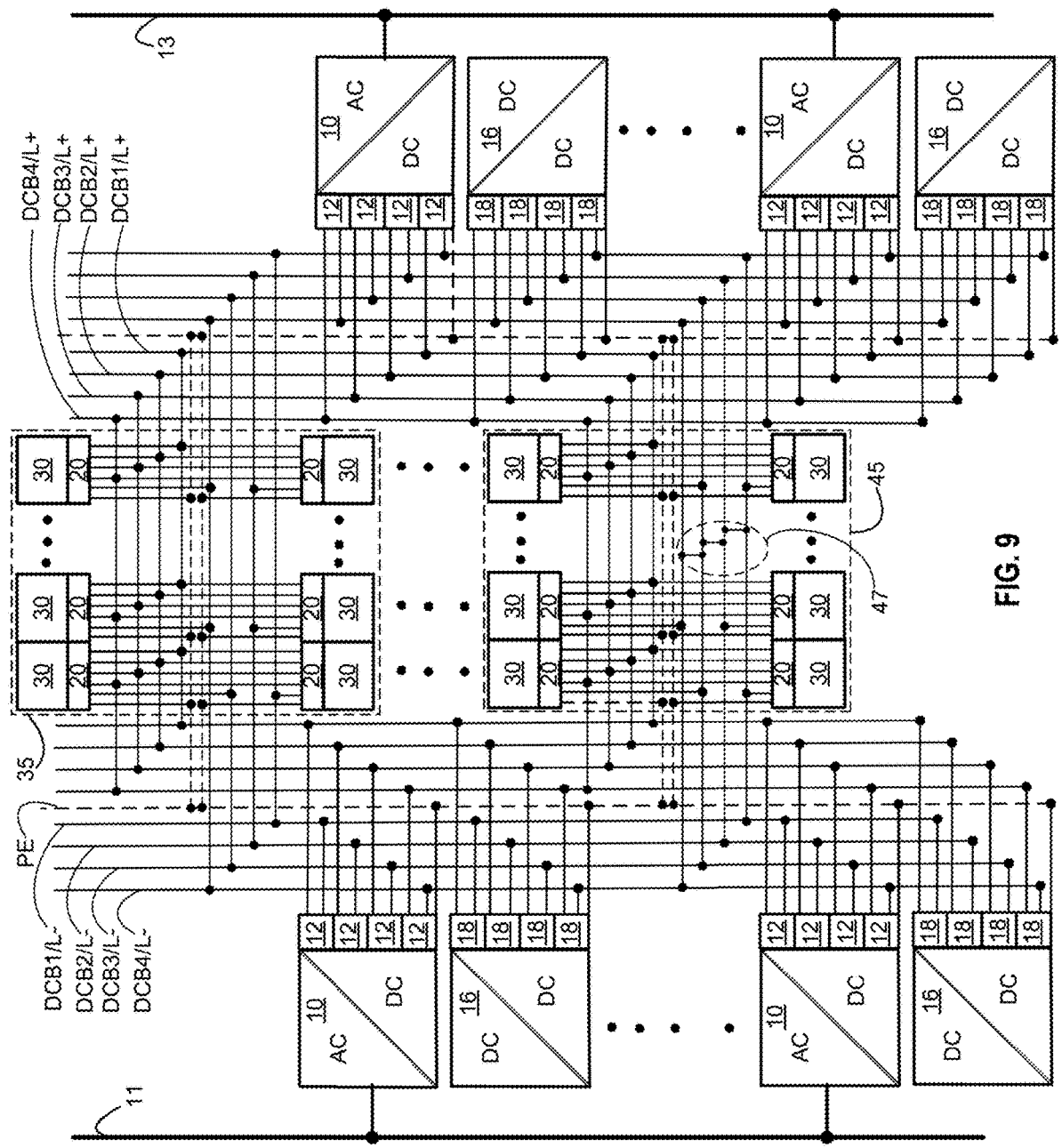
FIG. 9 schematically depicts an illustrative partial floorplan of a data center that comprises a DC power distribution mesh architecture, in accordance with some embodiments.

FIG. 9 schematically depicts an illustrative partial floorplan of a data center that comprises a DC power distribution mesh architecture in accordance with some embodiments according to the present disclosure. More specifically, the illustrative partial floorplan depicted in FIG. 9 incorporates aspects of the power distribution architecture described hereinabove with respect to illustrative embodiments of FIGS. 1 through 7. As shown, loads 30 (e.g., server racks or cabinets) and associated load combiners 20 may be arranged as a plurality P (e.g., by way of non-limiting example, P may equal 12) of subarrays 35, 45, each subarray comprising two rows of loads 30 and associated load combiners 20, each row comprising integer Q (e.g., by way of non-limiting example, Q may equal 24) loads and associated load combiners. Server racks may be configured for hot aisle or cold aisle containment. DC buses comprising positive conductors DCB1/L+, DCB2/L+, DCB3/L+, DCB4/L+ and corresponding negative conductors DCB1/L-, DCB2/L-, DCB3/L-, DCB4/L- may be implemented as overhead bus bars distributed throughout the data center (facility) 100 with drops to load combiners 20. At one or more locations 47 in the distribution network, preferably near a load combiner, the negative conductors DCB1/L-, DCB2/L-, DCB3/L-, DCB4/L- may be conductively connected ("strapped") to each other, as the return current is shared among the buses. As shown in FIG. 9 (and as illustrated in FIGS. 8A and 8B), an individual L- conductor, corresponding to a drop from a respective one of conductors DCB1/L-, DCB2/L-, DCB3/L-, DCB4/L-, may be coupled to each load combiner 20, which includes respective drops from each of the positive conductors DCB1/L+, DCB2/L+, DCB3/L+, DCB4/L+. Grounding conductor PE, for implementing a TN-S grounding configuration, may likewise be implemented as an overhead bus bar with equipment drops. As shown, each of AC buses 11 and 13 is coupled to a respective plurality R of AC/DC converters 10 (e.g., by way of non-limiting example, R may equal 6), each of which actively supplies power in parallel to the loads 30 via buses DCB1, DCB2, DCB3, DCB4 and load combiners 20. In this illustrative embodiment, each AC/DC converter has an associated backup DC/DC converter which may be coupled to a battery (not shown) or other alternative source of DC power.

It may be understood that many alternative data center floor plan configurations incorporating a DC power distribution mesh architecture in accordance with the various alternative embodiments of the present disclosure are possible. By way of non-limiting example, additional vertical AC buses (e.g., three vertical AC buses instead of only two buses 11, 13) may be employed to expand the extent of the data center and/or the mesh redundancy configuration. In addition, although not provided in the embodiments described hereinabove, various alternative embodiments may include DC sources that are not normally operational and are instead reserved as a backup or replacement source.

As will be understood by those skilled in the art in view of the present disclosure, in addition to providing parallel, active redundancy and distributing the power required by the facility loads over a plurality of buses, a distributed architecture in accordance with some embodiments may also reduce the required capacity (e.g., power, current, etc.) or other specifications of individual components, such as the rectifiers (e.g., active front ends (AFEs)), circuit breakers, bus conductors, etc., thus providing for reduced cost and/or enabling implementation with devices (e.g., solid state switches) that possibly may not be available at higher powers.

In view of the foregoing disclosure, it may be understood that a DC power distribution network in accordance with some embodiments may be advantageously implemented (e.g., through control and, e.g., selective use of inductive elements) so as to mitigate, limit, and/or preclude high frequency signal components (e.g., rapid rates of change in current) during normal operation of DC power distribution to the loads during and preferably also during start-up (e.g., black start) and charging of the distribution network (e.g., buses). Such implementations limiting and/or precluding high frequency current components from being present on the bus under normal operating conditions will facilitate high-speed detection and clearing of faults (e.g., short circuits) at least insofar as detection by protection control circuits 44 and 54 of high frequency signal (e.g., current) components, whether in the frequency domain or time domain (e.g., di/dt), may be considered unambiguously indicative of a fault. As will be understood, high speed detection and clearing of faults provides for improved selectivity and reliability.

Although the above description of illustrative embodiments of the present invention, as well as various illustrative modifications and features thereof, provides many specificities, these enabling details should not be construed as limiting the scope of the invention, and it will be readily understood by those persons skilled in the art that the present invention is susceptible to many modifications, adaptations, variations, omissions, additions, and equivalent implementations without departing from this scope and without diminishing its attendant advantages. For instance, the structure and/or function of a component may be combined into a single component or divided among two or more components. In addition, it is specifically contemplated that a particular feature described, either individually or as part of an embodiment, can be combined with other individually described features, or parts of other embodiments. It is further noted that the terms and expressions have been used as terms of description and not terms of limitation. There is no intention to use the terms or expressions to exclude any equivalents of features shown and described or portions thereof. Additionally, the present invention may be practiced without necessarily providing one or more of the advantages described herein or otherwise understood in view of the disclosure and/or that may be realized in some embodiments thereof. It is therefore intended that the present invention is not limited to the disclosed embodiments but should be defined in accordance with claims that are based on the present disclosure, as such claims may be presented herein and/or in any patent applications claiming priority to, based on, and/or corresponding to the present disclosure.

The invention claimed is:

1. A DC power distribution system, comprising:
a plurality, M, of DC buses, wherein M is an integer greater than one and M=(N+1), and wherein each of the M DC buses comprises a plurality of bus conductors;
a plurality, K, of DC power sources, wherein K is an integer greater than one and K=(J+1), and wherein the DC power sources are configured to have a nominally and/or substantially equal output voltage, and wherein each of the K DC power sources is
  (i) coupled to each of the M DC buses in parallel via a respective first protection device that is configured to selectively cause an open-circuit between the DC power source and the respective DC bus in the event of a fault or overload condition on the respective DC bus, and
  (ii) configured to, in operation, supply a current in parallel at the nominally and/or substantially equal output voltage to each of the M DC buses for which the respective first protection device of the DC power source is in a closed-circuit state;
at least one load combiner, each load combiner located at or within at least one load device such that each load device supplied by the DC power distribution system is supplied power via one of the load combiners, wherein the load combiner is coupled to each of the plurality of DC buses and configured to provide an output to at least one DC-to-DC step-down converter coupled to the at least one load device, wherein the load combiner comprises at least one second protection device configured to selectively cause an open-circuit between the plurality of DC buses and said output in the event of a fault or overload condition in one or more of the at least one load device;
wherein each of the DC power sources supplies approximately an equal share of the load current supplied by the DC buses to which the DC power source is conductively connected during operation;
wherein the DC power distribution system is configured to provide at least (J+1) redundancy based on the total maximum load; and
wherein the DC buses, the load combiners, and the DC power sources are each configured such that the total maximum load current is capable of being supplied via less than M of the DC buses, in the event that any one of the M buses is non-operational.

2. The DC power distribution system according to claim 1, wherein the DC buses, the load combiners, and the DC power sources are each configured such that the total maximum load current is capable of being supplied via any of N DC buses in the event that any one of the M buses is non-operational.

3. The DC power distribution system according to claim 1, wherein the DC buses, the load combiners, and the DC power sources are each configured such that the total maximum load current is capable of being supplied via not less than any two of the DC buses, in the event that all but two of the M buses are non-operational.

4. The DC power distribution system according to claim 1, wherein the DC buses, the load combiners, and the DC power sources are each configured such that the total maximum load current is capable of being supplied via any one of the DC buses, in the event that all but one of the M buses are non-operational.

5. The DC power distribution system according to claim 1, wherein each of the DC power sources has substantially the same power capacity.

6. The DC power distribution system according to claim 1, wherein each of the bus conductors comprises a bus bar that is connected to each of the DC power sources and to at least one load combiner.

7. The DC power distribution system according to claim 1, wherein each of the bus conductors comprises a first bus bar that is connected to each of the DC power sources and a second bus bar that is connected to the first bus bar and to at least one load combiner, wherein the first bus bar has a greater per unit length conductance than the second bus bar.

8. The DC power distribution system according to claim 1, wherein the load combiner comprises M branches, each branch connected to a respective one of the DC buses and forming an OR connection to provide said output, each branch comprising a diode coupled in series with a transistor switch, each transistor switch being controlled to switch to an open-circuit state in the event of a fault or overload condition in one or more of the at least one load device supplied power via the load combiner.

9. The DC power distribution system according to claim 1, further comprising at least one DC energy storage system, wherein each of the at least one DC energy storage system is:
  (i) configured to have the nominal and/or substantially equal output voltage,
  (ii) coupled to each of the M DC buses via a respective third protection device that is configured to selectively cause an open-circuit between the DC energy storage system and the respective DC bus in the event of a fault or overload condition on the respective DC bus, and
  (iii) configured to, in operation, supply a current in parallel to each of the M DC buses for which the respective third protection device of the DC energy storage system is in a closed-circuit state, wherein each of the DC energy storage systems is configured to supply its respective current at the nominally and/or substantially equal output voltage.

* * * * *